United States Patent
Scardino

(10) Patent No.: US 11,753,326 B2
(45) Date of Patent: Sep. 12, 2023

(54) GLASS MANUFACTURING APPARATUS AND METHOD

(71) Applicant: Gerresheimer Glass Inc., Vineland, NJ (US)

(72) Inventor: Dean Scardino, Monroeville, NJ (US)

(73) Assignee: Gerresheimer Glass Inc., Vineland, NJ (US)

( * ) Notice: Subject to any disclaimer, the term of this patent is extended or adjusted under 35 U.S.C. 154(b) by 0 days.

(21) Appl. No.: 17/530,806

(22) Filed: Nov. 19, 2021

(65) Prior Publication Data

US 2022/0073404 A1 Mar. 10, 2022

Related U.S. Application Data

(62) Division of application No. 16/206,567, filed on Nov. 30, 2018, now Pat. No. 11,345,626.

(Continued)

(51) Int. Cl.
*C03B 35/00* (2006.01)
*C03B 35/06* (2006.01)
(Continued)

(52) U.S. Cl.
CPC ............ *C03B 35/066* (2013.01); *B65G 65/18* (2013.01); *C03B 35/12* (2013.01);
(Continued)

(58) Field of Classification Search
CPC ......... B65B 21/18; B65B 35/38; B65B 43/18; B65B 43/46; B65G 47/847; B65G 65/18;
(Continued)

(56) References Cited

U.S. PATENT DOCUMENTS 2,180,737 A 11/1939 Hess
3,101,848 A 8/1963 Uhlig
(Continued)

FOREIGN PATENT DOCUMENTS

CN 1102793 A 5/1995
CN 1576171 A 2/2005
(Continued)

OTHER PUBLICATIONS

First Office Action for Chinese Patent Application No. 201980007114 dated Mar. 1, 2022 and its English translation.

(Continued)

*Primary Examiner* — Eyamindae C Jallow
(74) *Attorney, Agent, or Firm* — McCormick, Paulding & Huber PLLC

(57) ABSTRACT

An apparatus and method for manufacturing glass containers handles the containers individually after a hot forming process and annealing to prevent glass-to-glass contact. By handling the containers individually and preventing glass-to-glass contact damage to the containers in the form of checks and scratches is avoided. To prevent contact of the containers and damage arising from the contact, the equipment including conveyors, pushers, starwheels, shuttles, and transfer heads that move the glass containers through the apparatus maintains the glass containers in uniform spaced relationship at each stage of container processing until the containers are packaged.

11 Claims, 8 Drawing Sheets

Related U.S. Application Data

(60) Provisional application No. 62/702,032, filed on Jul. 23, 2018.

(51) Int. Cl.
  *B65G 65/18* (2006.01)
  *C03B 35/12* (2006.01)

(52) U.S. Cl.
  CPC .. *B65G 2201/0235* (2013.01); *B65G 2207/14* (2013.01); *B65G 2207/36* (2013.01); *B65G 2811/0615* (2013.01); *B65G 2811/0631* (2013.01); *B65G 2814/0205* (2013.01)

(58) Field of Classification Search
  CPC .... B65G 2201/0235; B65G 2201/0244; B65G 2207/14; C03B 35/12
  See application file for complete search history.

(56) References Cited

U.S. PATENT DOCUMENTS

| | | | |
|---|---|---|---|
| 3,313,409 | A | 4/1967 | Johnson |
| 3,650,724 | A | 3/1972 | Lush |
| 3,651,937 | A | 3/1972 | Kronseder |
| 3,971,190 | A * | 7/1976 | McGill ............ B65B 21/18 53/247 |
| 4,146,134 | A | 3/1979 | Keen et al. |
| 4,691,830 | A | 9/1987 | Ahl et al. |
| 5,148,654 | A | 9/1992 | Kisters |
| 5,241,250 | A * | 8/1993 | Nagasawa ........ G05B 19/4141 318/591 |
| 5,613,593 | A | 3/1997 | Gerber |
| 5,960,933 | A | 10/1999 | Albrecht |
| 6,722,101 | B2 * | 4/2004 | Hartness ............ B65B 21/183 53/376.4 |
| 6,868,652 | B2 | 3/2005 | Arends et al. |
| 6,983,577 | B2 * | 1/2006 | Hartness ............ B65B 21/183 141/237 |
| 7,438,192 | B1 | 10/2008 | Kohler et al. |
| 7,856,797 | B2 * | 12/2010 | Black .................. B65B 35/44 53/247 |
| 8,468,781 | B2 * | 6/2013 | Fritzsche ............ B65G 57/06 53/540 |
| 8,893,526 | B2 | 11/2014 | Liu et al. |
| 9,718,720 | B2 | 8/2017 | Brown |
| 2012/0175224 | A1 | 7/2012 | Briggs et al. |
| 2013/0291483 | A1 | 11/2013 | Van Gerwen |
| 2014/0190126 | A1 | 6/2014 | de Hertogh |
| 2015/0001116 | A1 | 1/2015 | Schmal et al. |
| 2015/0040518 | A1 | 2/2015 | Shanteau et al. |
| 2017/0203865 | A1 | 7/2017 | Kalany et al. |

FOREIGN PATENT DOCUMENTS

| | | |
|---|---|---|
| CN | 2847275 Y | 12/2006 |
| CN | 101121464 A | 2/2008 |
| CN | 101489878 A | 7/2009 |
| CN | 202379156 U | 8/2012 |
| CN | 103702904 A | 4/2014 |
| CN | 105686953 A | 6/2016 |
| CZ | 4181-97 A3 | 8/1998 |
| DE | 4224540 A1 | 1/1994 |
| DE | 385 28 64 T2 | 5/1995 |
| EP | 0 635 315 A3 | 9/1995 |
| EP | 3009410 A1 | 4/2016 |
| GB | 1 299 974 A | 12/1972 |
| HU | 224-777 B1 | 2/2006 |
| JP | S49-27552 B1 | 7/1974 |
| JP | S54-32426 U | 3/1979 |
| JP | H4-242503 A | 8/1992 |
| JP | H06-56108 A | 3/1994 |
| JP | 2000-39352 A | 2/2000 |
| JP | 2002-87584 A | 3/2002 |
| JP | 2002-340541 A | 11/2002 |
| JP | 5279053 B2 | 9/2013 |
| JP | 2014-504504 A | 2/2014 |
| JP | 2016-079089 A | 5/2016 |
| JP | 2017-1685 A | 1/2017 |
| KR | 10-2011-0097330 B1 | 4/2013 |
| WO | 2013/001497 A1 | 1/2013 |
| WO | 2016/177972 A1 | 11/2016 |
| WO | 2018/011748 A1 | 1/2018 |
| WO | 2020023097 A1 | 1/2020 |

OTHER PUBLICATIONS

Notice of Rejection Ground for corresponding Japanese Patent Application No. 2021-141797, dated Sep. 27, 2022 and its English translation.
First Examination Report for Indian Patent Application No. 202148019963 dated May 26, 2022.
First Examination Report for Indian Patent Application No. 202148019932 dated Mar. 25, 2022.
First Examination Report for Indian Patent Application No. 202148019957 dated Apr. 22, 2022.
Notice of Reject Ground for corresponding Japanese Patent Application No. 2021-141796 dated Dec. 20, 2022 and its English translation.
Notice of Reject Ground for corresponding Japanese Patent Application No. 2021-141795 dated Dec. 20, 2022 and its English translation.
First Office Action issued for corresponding Chinese Patent Application Serial No. 202210815995.1, dated May 5, 2023 and its English translation.
First Office Action issued for corresponding Chinese Patent Application Serial No. 202210807439.X, dated May 7, 2023 and its English translation.
First Office Action issued for corresponding Chinese Patent Application Serial No. 202210821201.2, dated May 6, 2023 and its English translation.

* cited by examiner

US 11,753,326 B2

GLASS MANUFACTURING APPARATUS AND METHOD

CROSS REFERENCE TO RELATED APPLICATION

This application claims the benefit of U.S. Provisional Application No. 62/702,032, filed Jul. 23, 2018, and is a division of U.S. patent application Ser. No. 16/206,567 filed on Nov. 30, 2018, the entirety of which are incorporated herein by reference.

TECHNICAL FIELD

The present invention relates to the field of glass manufacturing and particularly to the apparatus and method for handling glass containers following molten formation and discharge from a lehr where the containers are cooled and annealed. The apparatus is specially designed to ensure that the containers are handled individually to avoid glass-to-glass contact during inspection and packaging.

BACKGROUND

In the course of manufacturing glass containers in a hot forming process that either starts with a molten glob of glass material which is molded to shape or starts with a tubular glass body that is heated to a molten state and then formed into a container shape, the hot glass generally passes through an annealing oven or lehr to remove stresses from the molding or molding process.

In the past the manufacture of glass containers in high volume using the process described above the containers were handled in mass, that is, the containers while still warm were handled as a group gathered together in contacting relationship with one another at various stages of processing after annealing. The pushing and bumping of the glass containers against one another while still warm caused checks and scratches in the glass container. Such checks and cracks are flaws in what is supposed to be a flawless container, and can interfere with subsequent processing of the containers in filling lines, and thereby render the container useless.

For example, it is customary in filling glass vials with pharmaceutical products to inspect each vial for proper filling by projecting a beam of light against one side of the container and detecting the projected beam emerging for the opposite side for consistency with the pharmaceutical filling inside. If the container itself has a check or crack, the emerging beam of light could be affected and falsely indicate a defective filling. Accordingly, glass containers being fed to a filling line should be flawless to begin with. This requirement in turn makes demands on the processing of the glass containers at the manufacturing level.

Accordingly, it is an object of the present invention to produce glass containers without flaws through improvements in the handling of the containers at the manufacturing level.

SUMMARY

In accordance with the object, the improvement in the handling of the glass containers begins with the transfer of the containers from the conveyor advancing the containers through the annealing oven or lehr. Generally, the containers are positioned on the lehr conveyor in spaced but not necessarily in uniform spaced relationship.

To this end, one aspect of the invention comprises an apparatus for manufacturing glass containers having a transfer head that carries glass containers from the cold end of a lehr conveyor where the rows of glass containers are not in uniform spaced relationship, to a second conveyor that carries a sequence of the glass containers in uniform spaced relationship for subsequent processing. A deadplate is interposed between the first conveyor and the second conveyor. The transfer head is mounted above the dead plate and the first conveyor is movable between the deadplate and the first conveyor for transferring glass containers from the first conveyor where the glass containers are not in uniform spaced relationship to the deadplate and depositing the containers on the deadplate in uniform spaced relationship. To bring about order to the positioning of the containers relative to one another, the transfer head has uniformly spaced pockets for receiving glass containers in a row on the first conveyor and positioning the containers of the row on the deadplate in uniform spaced relationship.

A pusher bar is movably mounted over the deadplate for pushing the glass containers deposited on the deadplate by the transfer head onto the second conveyor while maintaining the uniform spaced relationship. The pusher bar has pockets that are uniformly spaced to correspond to the uniformly spaced pockets on the transfer head.

In another aspect of the invention, the glass manufacturing apparatus and method produces the glass containers in a continuous process between a lehr for annealing the glass containers after hot glass formation, an inspection station for examining the annealed containers for defects, and a packaging station where a plurality of the glass containers are placed in packages. A series of conveying mechanisms are configured to move the glass containers from the lehr through the inspection and packaging stations while maintaining the containers in spaced, non-contacting relationship with each other. A programmable logic controller is connected with the inspection station, the packaging station, and the series of conveying mechanisms to advance the glass containers between the stations and within the stations in timed relationship and to maintain a spaced relationship between the containers.

In still a further aspect of the invention, an apparatus for producing glass containers has an inspection station receiving, inspecting, and discharging glass containers in sequence. The inspection station has a rejection mechanism for ejecting from the sequence any container that does not pass inspection. At the output of the inspection station, a discharge conveyor is connected with the inspection station for receiving the glass containers discharged after passing inspection. The discharging conveyor conveys the glass containers away from the inspection station in a consecutive sequence of containers in predetermined spatial relationship with one another.

For this purpose, a controller is connected in controlling relationship with the inspection station and the conveyor and interrupts the operation of the discharge conveyor whenever a container is ejected from the sequence by the rejection mechanism. In this manner, a consecutive sequence of containers in predetermined spatial relationship is maintained on the conveyor.

In still a further aspect of the invention, apparatus is provided for placing individual articles, such as the glass containers, in a package such as a cell pack. The apparatus has a conveyor for conveying a series of articles to a packaging station. First and second shuttles are disposed adjacent the conveyor at the packaging station, and each shuttle is movable back and forth between a loading position and an unloading position. A controlled drive mechanism is connected with the first and second shuttles to move the shuttles between the loading and unloading positions in alternating fashion, whereby one shuttle can be loaded with articles at the loading position while the other shuttle is unloaded at the unloading position. A package table is placed at the unloading position of the shuttles and supports the cell pack having individual cells for receiving individual articles.

Each shuttle has a number of pockets for receiving a corresponding number of articles from the conveyor at the loading position and transferring the articles to the unloading position. A shuttle loader at the loading position is configured to transfer the articles from the series on the conveyor to the pockets of the first and second shuttles.

A shuttle unloader at the unloading position of the shuttles is configured to transfer the articles from the pockets of the shuttles to the cells of the cell pack on the packaging table. The shuttle unloader has a transfer head configured to engage each individual article in a pocket of the first or second shuttle at the top of the article for lifting, transferring, and lowering of each individual article into an individual cell of a cell pack on the packaging table.

By handling the glass containers individually between annealing in the lehr and the packaging at the packaging station, checks and scratches in the containers are minimized or eliminated entirely.

DESCRIPTION OF THE PREFERRED EMBODIMENTS

Figure 1:
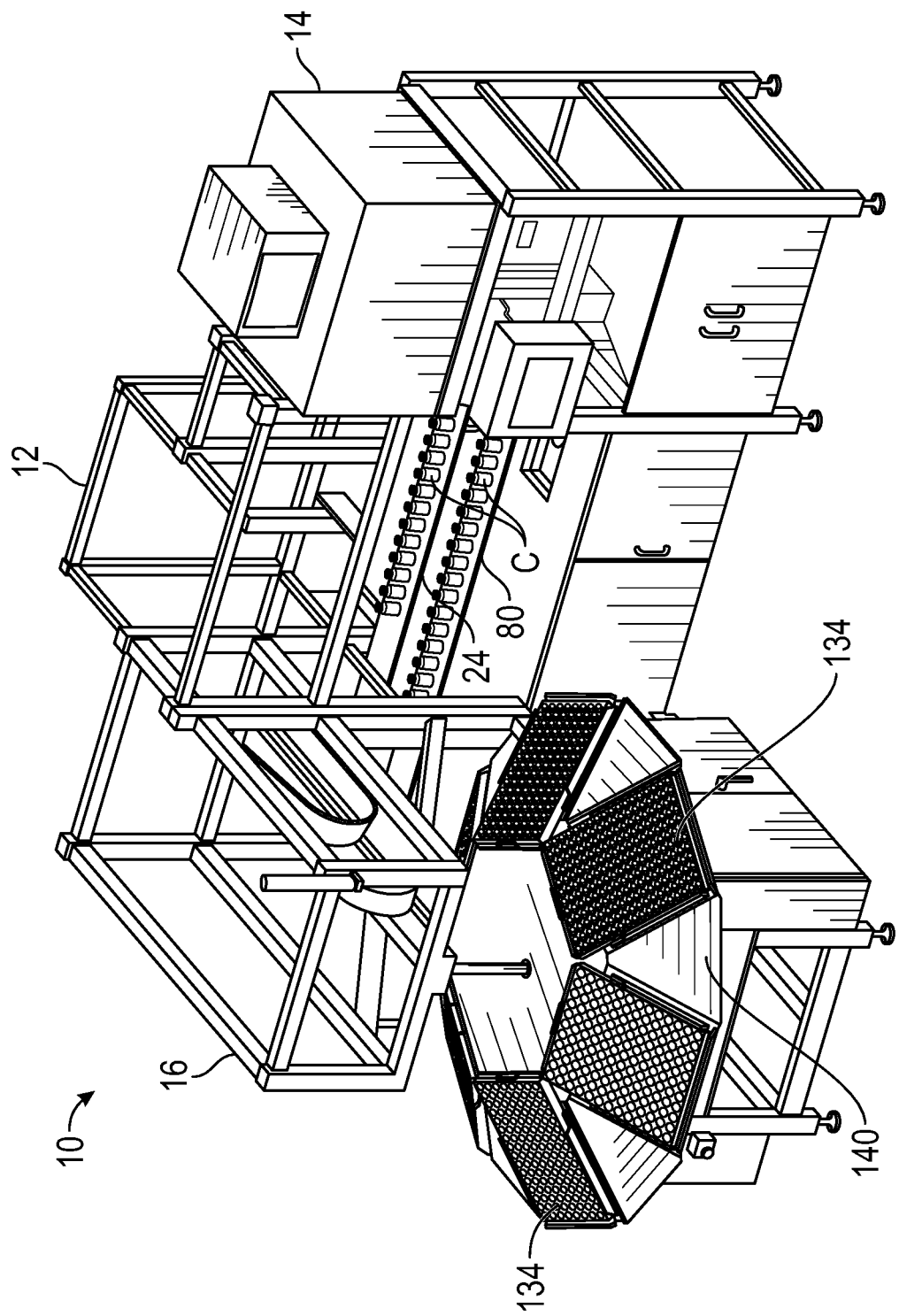
FIG. 1 is a perspective view showing the output portion of an apparatus for manufacturing glass containers from the front.
Figure 2:
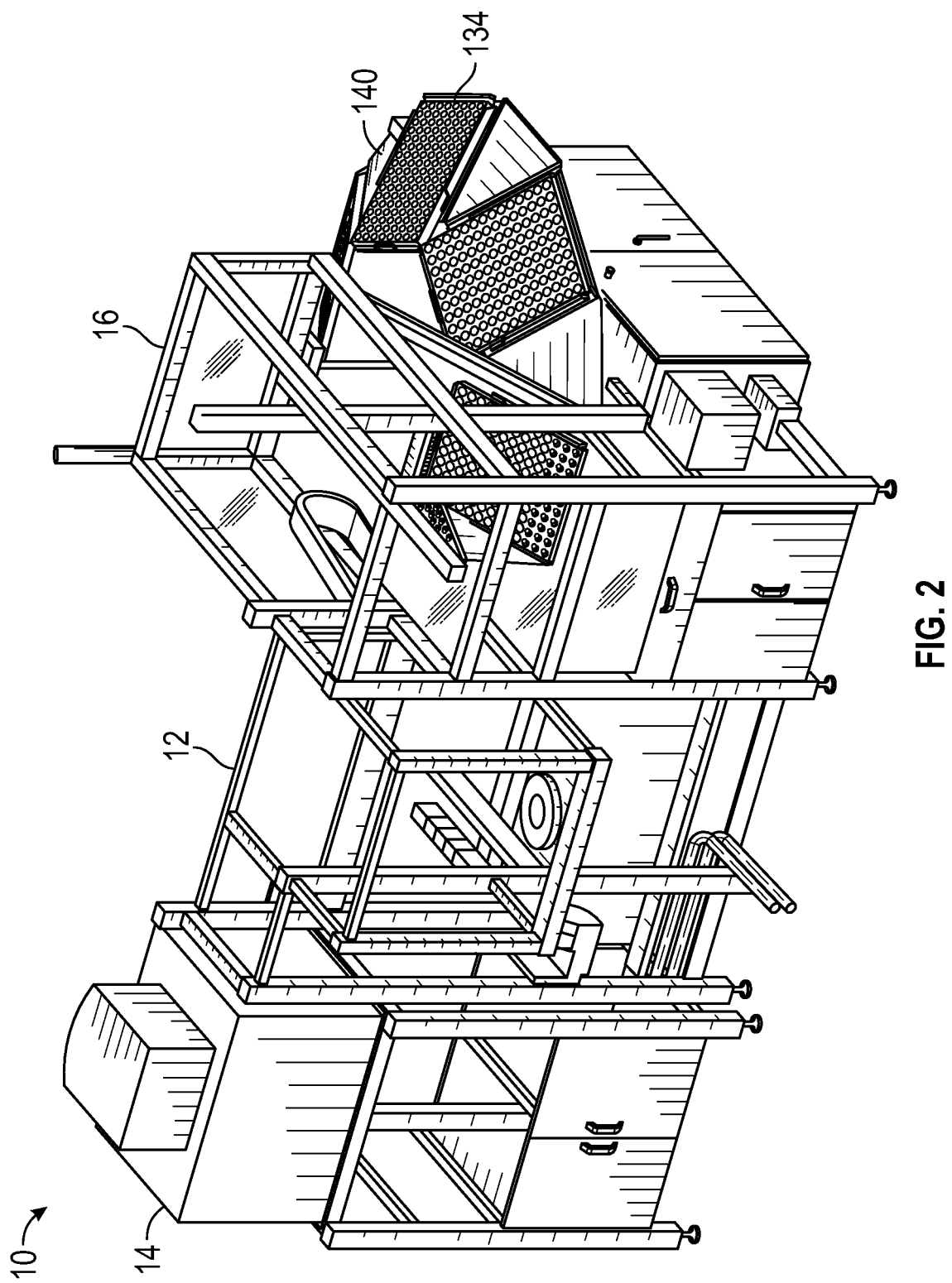
FIG. 2 is a perspective view of the apparatus in FIG. 1 from the rear.
Figure 3:
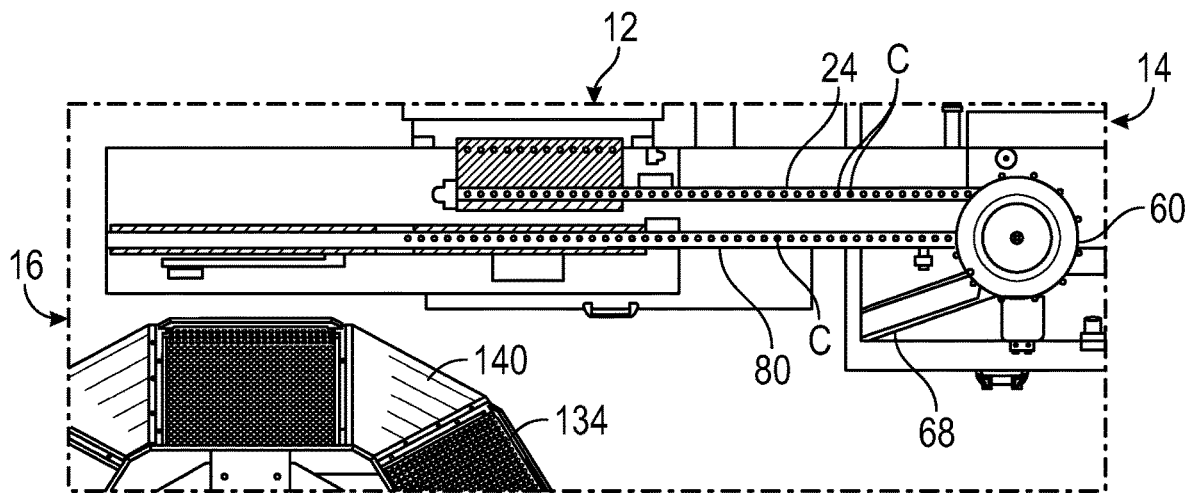
FIG. 3 is a top plan view showing the arrangement of the various processing stations for the glass containers in the apparatus of FIG. 1.

FIGS. 1, 2, and 3 show a general arrangement of a glass manufacturing apparatus 10 between a curing oven or lehr (not illustrated) for annealing glass containers C after formation and a packaging station for the glass containers. The glass containers C may initially have been formed from glass tubes or molten glass gobs in a blow molding process, and are composed of a silicate material, typically a borosilicate. The newly formed containers are generally hot and require heat treatment or annealing in a lehr to eliminate internal stresses and improve fracture resistance.

A lehr unloading section 12 is located generally in the middle of the glass manufacturing apparatus 10 and receives the glass containers C from the lehr. The containers are then fed into an inspection station 14 where the containers are inspected for cosmetic defects. From the inspection station 14 the glass containers are moved to a packaging station 16 where the containers are loaded into cell packs. Although the illustrated apparatus 10 places the lehr unloading section 12 in the middle of the apparatus, other arrangements are also possible. For example the lehr unloading section 12, the inspection station 14, and the packaging station 16 could be laid out in a linear array in that order if space is available.

Figure 4:
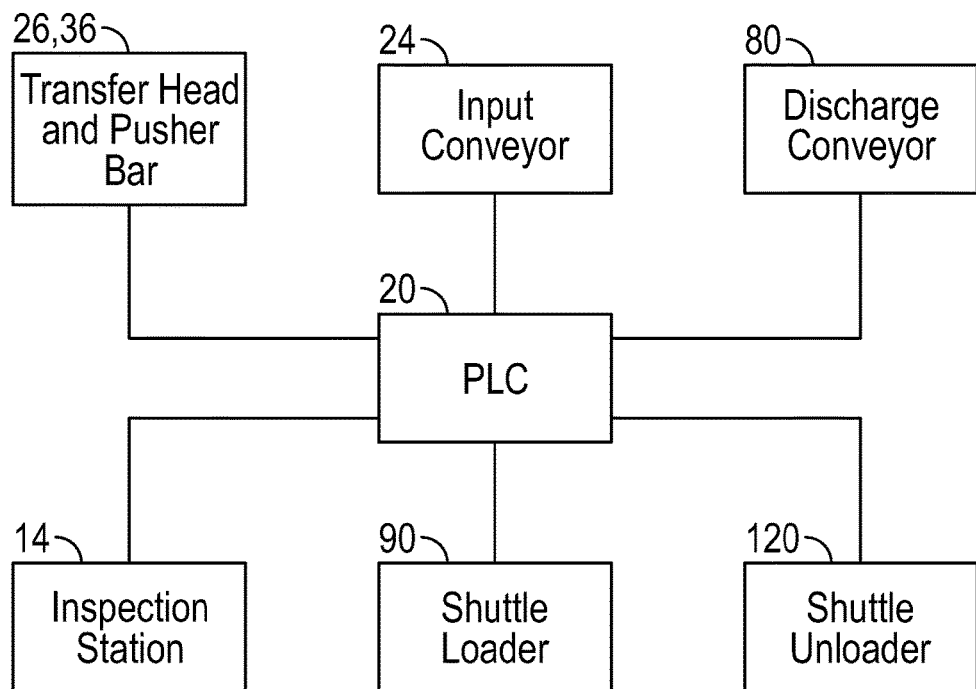
FIG. 4 is a block diagram illustrating the controls for synchronizing the various operations of the glass manufacturing apparatus in FIG. 1.

The movement of the glass containers C between the various stations and the operations at each station are coordinated and controlled by a central programmable logic controller (PLC) 20 shown in FIG. 4. The movement of the glass containers is accomplished by various conveying mechanisms described below. The operations of the conveying mechanisms are timed to move the containers appropriately for the operations to be performed at each station, and to maintain the containers in uniform spaced relationship with one another throughout the movements. By contrast, in prior art systems the glass containers were pushed together at various stations and then handled separately when the stations were ready to perform the intended functions. It has been determined that the glass-to-glass contact of the containers when handled in groups can cause checking or scratching which interferes with later inspection processes and lowers the fracture strength of the glass containers, that is, the resistance of the glass containers to fracture. By controlling the various operations of the apparatus 10 and movement of the glass containers through the apparatus in timed relationship with one another through the PLC 20, maintaining the glass containers in spaced relationship through the various manufacturing operations is possible, and defects in the glass containers are substantially reduced or eliminated entirely.

Figure 5:
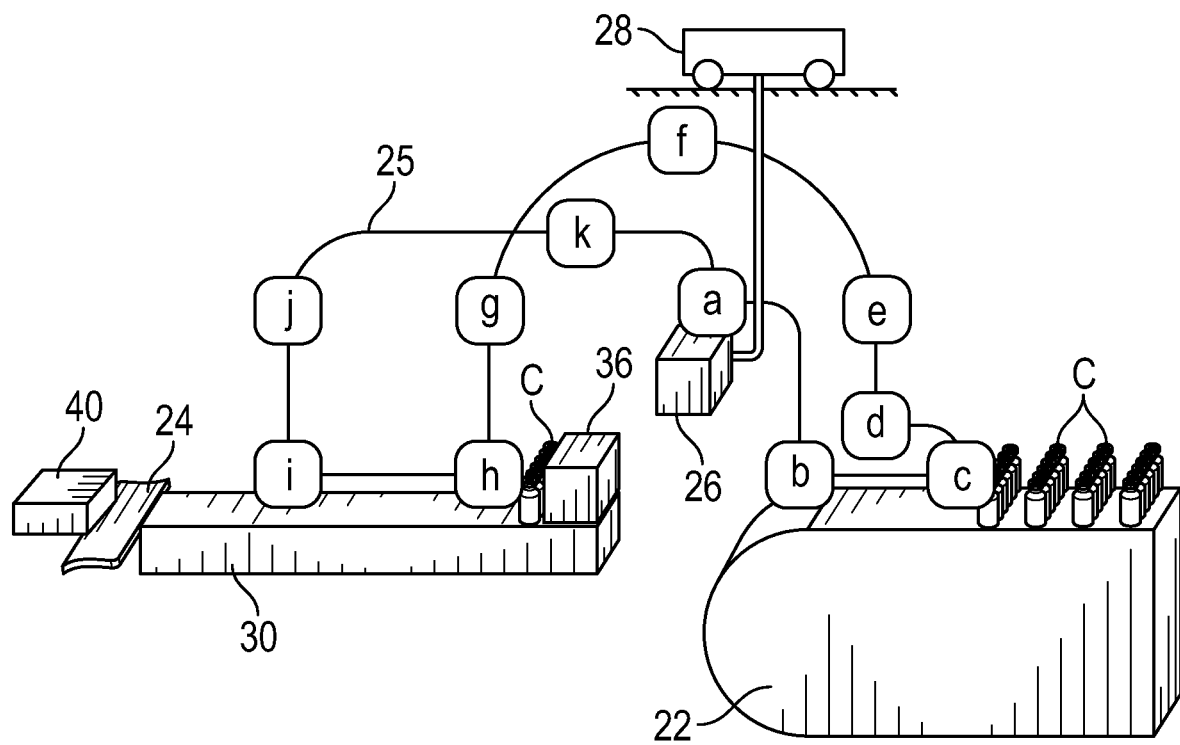
FIG. 5 is a schematic perspective view of the portion of apparatus for transferring glass containers from a lehr conveyor to an input deadplate.

FIG. 5 illustrates the mechanisms for unloading the glass containers C from the discharge end of a lehr conveyor 22 and transferring the containers to an input conveyor 24 which feeds the containers one-by-one toward subsequent operations of the apparatus. The glass containers C at the discharge end of the lehr conveyor 22 are illustrated in rows, but in practice the containers are generally not uniformly spaced from one another. Additionally the containers move on the lehr conveyor at a steady speed during annealing of the glass. Consequently, in order to bring about an orderly arrangement of the containers for subsequent operations, a transfer head 26 is suspended from a moveable gantry 28 above the discharge end of the conveyor and a deadplate 30 where the containers are deposited by the head with a uniform spacing. The sequence of movements of the transfer head 26 by the gantry 28 along a path 25 between the lehr conveyor 22 and the deadplate 30 is illustrated by the letter sequence a, b, c, d, e, f, g, h, i, j, and k at various positions on the path and is controlled by the PLC 20 of FIG. 4.

Figure 6:
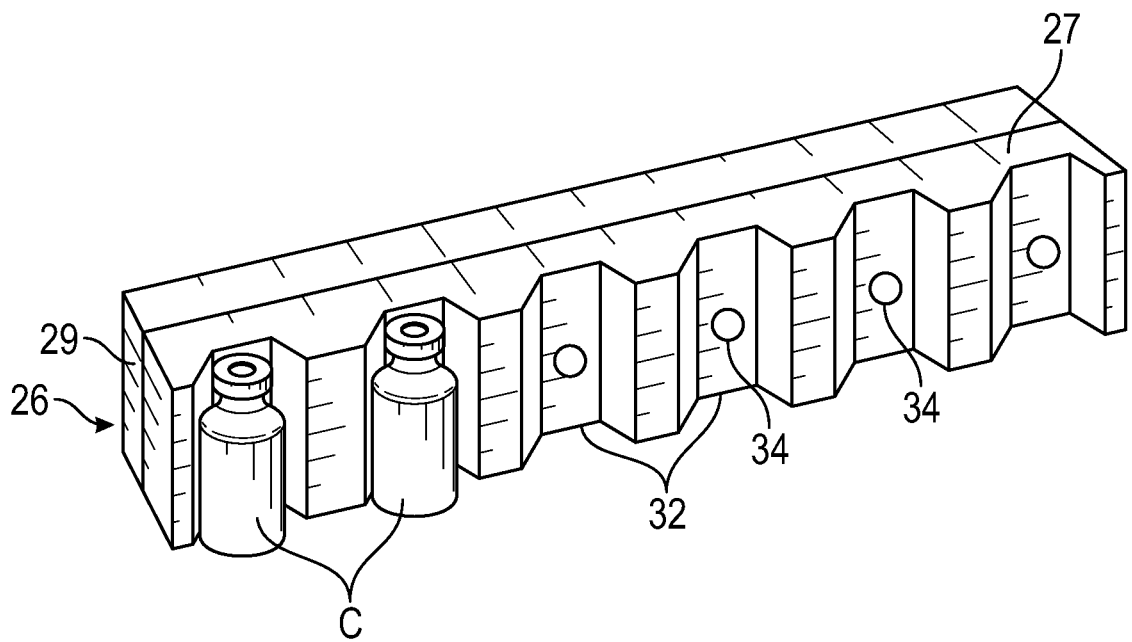
FIG. 6 is a detailed view of a transfer head used in FIG. 5.

To bring about a uniform arrangement of the containers on the deadplate 30 from the non-uniform arrangement on the lehr conveyor 22, the transfer head 26 is designed with V-shaped pockets 32 as shown in FIG. 6. Each of the pockets is sized to receive one glass container C as the containers on the lehr conveyor and the head move toward one another. The V-shaped pockets 32 are uniformly spaced along the head 26 so that any non-uniform spacing of the containers in a row on the lehr conveyor is rectified by the time the containers C are captured in the pockets. The pockets 32 may be formed in a firm resilient material 27, such as the thermoplastic Delrin, or a plastic foam material mounted on a backing plate 29 to protect the containers from being scratched when captured in the pocket and during transfer to the deadplate 30.

In addition, each of the pockets 32 of the transfer head 26 has a vacuum port 34 which is activated by the PLC 20 to draw a container into the pocket and firmly hold the container in the head as the head removes the container from the lehr conveyor 22 onto the deadplate 30. As an alternative to the vacuum port, each pocket could be provided with a mechanical capturing arrangement, but the "soft" engagement by a resilient pocket material and vacuum is preferred. The vacuum port may also be distributed around the container C if the pocket is constructed by an open-cell foam material.

Figure 7:
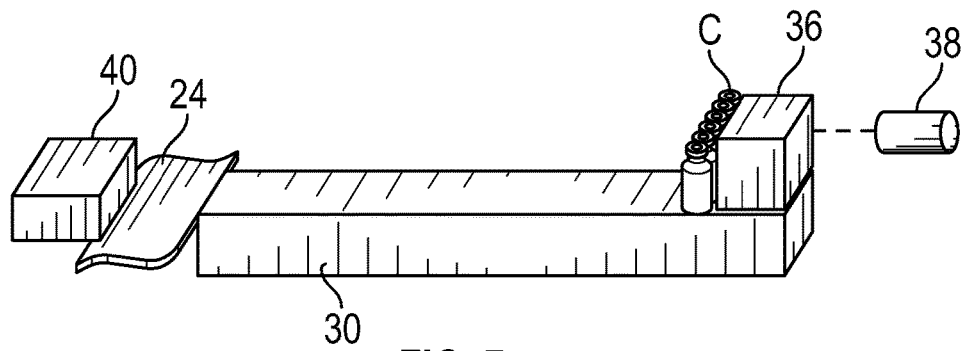
FIG. 7 is a perspective view of the input deadplate and pusher bar for moving the glass containers onto an input conveyor for further processing of the glass containers.

After the glass containers C are deposited on the deadplate 30 by the transfer head 26, the vacuum holding the containers is released, and the transfer head is moved from position h to i shown in FIG. 5. The containers are then positioned by the transfer head on the deadplate 30 in a starting position in front of a pusher bar 36 which is driven by a servomotor 38 as shown in FIG. 7. The pusher bar 36 is constructed in a manner similar to the transfer head 26 although the bar faces toward the input conveyor 24 rather than the lehr conveyor 22. The pusher bar may be provided with pockets corresponding to the pockets 32 on the transfer head, although the pockets on the pusher bar need not be as deep because the containers C are positioned by the transfer head on the deadplate in a row with uniform spacing at the starting position in front of the pusher bar. Additionally, the pusher bar does not require vacuum ports in the pockets for holding the containers.

With the containers C positioned on the deadplate at the starting position as shown in FIGS. 5 and 7, and the transfer head moved out of the way to position j by the PLC 20 of FIG. 4, the pusher bar 36 is activated by the PLC and pushes a row of containers C from the starting position at one end of the deadplate to the other end and onto the input conveyor 24 against a stop 40. The stop 40 may be a relatively hard stop to position the containers accurately in spaced relationship on the conveyor. The stop can be made with a firm material, such Delrin thermoplastic, to protect the containers from scratching or checking.

The operations of the input conveyor 24 and the pusher bar 36 are also coordinated by the PLC 20 as shown in FIG. 4 so that the conveyor movement is halted while the pusher bar pushes a row of containers C onto the conveyor. The pusher bar then returns to the starting position, and the conveyor moves the glass containers toward further operations with the containers positioned in uniformly spaced relationship on the conveyor in a sequence established by the transfer head 26.

Figure 8:
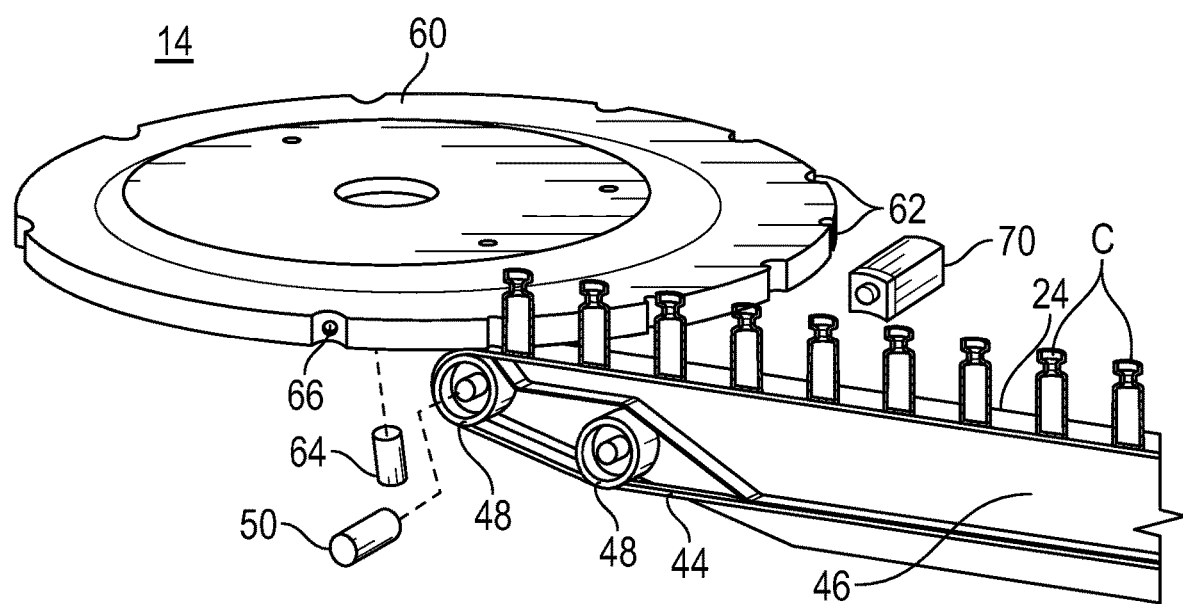
FIG. 8 is a perspective view of the input conveyor feeding glass containers into the starwheel at an inspection station in the glass manufacturing apparatus.

In one form, the input conveyor 24 is a vacuum belt conveyor shown in section in FIG. 8. The conveyor comprises an air permeable belt 44 that is driven over a vacuum manifold 46 with guide pulleys 48 by a servomotor 50. The vacuum drawn through the air permeable belt creates a vacuum force that holds the glass containers C on the belt in fixed positions and non-contacting relationship that is established when the containers are loaded onto the conveyor by the pusher bar 36.

Alternatively, the input conveyor belt could have a series of compartments to hold individual containers in spaced relationship. Loading of the containers into the compartments would require precise positioning of the belt to match the positions of the containers. However, precise positioning is also required with vacuum belts if the series of containers on the conveyor is to retain the uniform spacing throughout the length of the series.

As shown in FIGS. 3 and 8 the input conveyor 24 delivers the glass containers C to the inspection station 14 where a number inspection steps are performed on the containers. For this purpose, the inspection station has a starwheel 60 with pockets 62 at the periphery of the wheel for engaging the containers at a pickup point at the end of the input conveyor 24. The starwheel is driven by a servomotor 64 under the control of the PLC 20 of FIG. 4. Each pocket has a vacuum port 66 to capture a container C from the conveyor, and hold the container in an exposed relationship with a number of inspection devices (not shown) of known types distributed around the periphery of the wheel. The inspections are performed to detect gauging and cosmetic defects in the containers, and if a defect is found such that the container does not pass inspection, the container is ejected through a rejection chute 68 shown in FIG. 3. The release of a defective container from the pocket of the starwheel is coordinated between the inspection device and the vacuum port holding the defective container by the PLC 20 of FIG. 4.

To facilitate the transfer of the glass containers C from the input conveyor 24 to the starwheel 60 at the pickup point, the vacuum manifold 46 has a variable cross sectional area and the area is reduced at the pickup point at the end of the conveyor 24 as shown in FIG. 8. With the reduced cross sectional area the vacuum force holding a container C on the air permeable belt 44 is reduced, and the vacuum force generated in the pocket 62 of the starwheel overcomes the force through the belt. Thus, a container C is transferred from the input conveyor 24 to the starwheel 60.

Additionally, the movement of the input conveyor 24 and the rotation of the starwheel 60 are coordinated and synchronized by the PLC 20 of FIG. 4 so that a pocket 62 of the starwheel is present at the pickup point at the end of the conveyor at the same time as the glass container C on the conveyor. The movement and rotation may be continuous or incremental. To aid in the synchronization, a container sensor 70 is positioned along the input conveyor, and is connected with the PLC to detect and signal the presence of a glass container in the sequence of containers on the conveyor. If a glass container is detected by the container sensor 70 the sensor sends a signal to the PLC. The PLC is programmed to cause the starwheel to rotate a pocket 62 into the pickup point and pickup the container. In the event that the presence of a glass container is not detected in the sequence by the container sensor, the PLC is programmed to interrupt the starwheel rotation until a container is eventually spotted.

It should be noted that the interruption of the starwheel rotation by the PLC 20 when the presence of a glass container in the sequence is not detected ensures that each pocket 62 of the starwheel 60 is loaded with a container. Hence, a continuous sequence of glass containers C is loaded onto the starwheel in the inspection station 14 from the input conveyor 24 even if a container is missing from the sequence on the conveyor.

FIG. 3 shows a discharge conveyor 80 leading from the starwheel 60 in the inspection station 14 to the packaging station 16. Movement of the discharge conveyor like the input conveyor 24 and the starwheel 60 is controlled by the PLC as indicated in FIG. 4. The discharge conveyor 80 is preferably a vacuum belt conveyor constructed like the input conveyor 24 with an air permeable belt overlying a vacuum manifold. Air drawn through the air permeable belt creates a vacuum force that holds the glass containers C in place on the conveyor. However, the discharge conveyor can take other forms such as mechanical pockets which hold the containers in uniformly spaced relationship.

The discharge conveyor 80 has a pickup point at the periphery of the starwheel at which the glass containers are transferred from the starwheel to the discharge conveyor by release of the vacuum in the pocket preferably supplemented by a jet of pressurized air to release a container from the starwheel and capture the container by way of vacuum force drawn through the air permeable conveyor belt. The vacuum release and movement of the belt on the discharge conveyor are also controlled by the PLC 20.

Also shown in FIG. 3 is the rejection chute 68 through which defective glass containers are ejected for failing inspection at some point in the inspection station 14. It will be understood that the ejection of a glass container from a pocket 62 of the starwheel 60 leaves an empty pocket and no container to be transferred to the discharge conveyor 80 when the empty pocket reaches the pickup point. The PLC receives signals of the ejections of containers, tracks movements of the empty pockets on the starwheel in a two-way communication link between the inspection station 14 and the PLC. Hence, the PLC is aware of empty pockets reaching the pickup point with the discharge conveyor 80. Alternatively, or additionally, a container sensor like the container sensor 70 can be positioned at the pickup point for the discharge conveyor to signal the absence of a container in the pocket 62 of the starwheel. Accordingly, the PLC interrupts the movement of the discharge conveyor when an empty pocket of the starwheel reaches the pickup point and does not resume movement until a pocket occupied by a glass container arrives at the pickup point and the glass container is transferred to the discharge conveyor. Hence, the synchronization of the starwheel rotation and the discharge conveyor movement by the PLC produces a continuous sequence of uniformly spaced glass containers C on the discharge conveyor 80 in spite of the rejection of a glass container in the inspection station 14.

It should also be noted as described above that the rotation of the starwheel 60 is interrupted by the PLC in the event that a container C is not detected by the container sensor 70 located along the input conveyor 24. Thus the absence of a container in the sequence of containers approaching the starwheel 60 and the rejection of a container in the inspection station 14 are noted and compensated for by the PLC by interrupting rotation of the starwheel 60 or movement of the discharge conveyor 80 to ensure that a continuous sequence of uniformly spaced containers C in non-contacting relationship is formed on the discharge conveyor.

FIG. 3 shows that the discharge conveyor 80 carries the continuous sequence of glass containers C in uniformly spaced, non-contacting relationship from the inspection station 14 to the packaging station 16.

Figure 9:
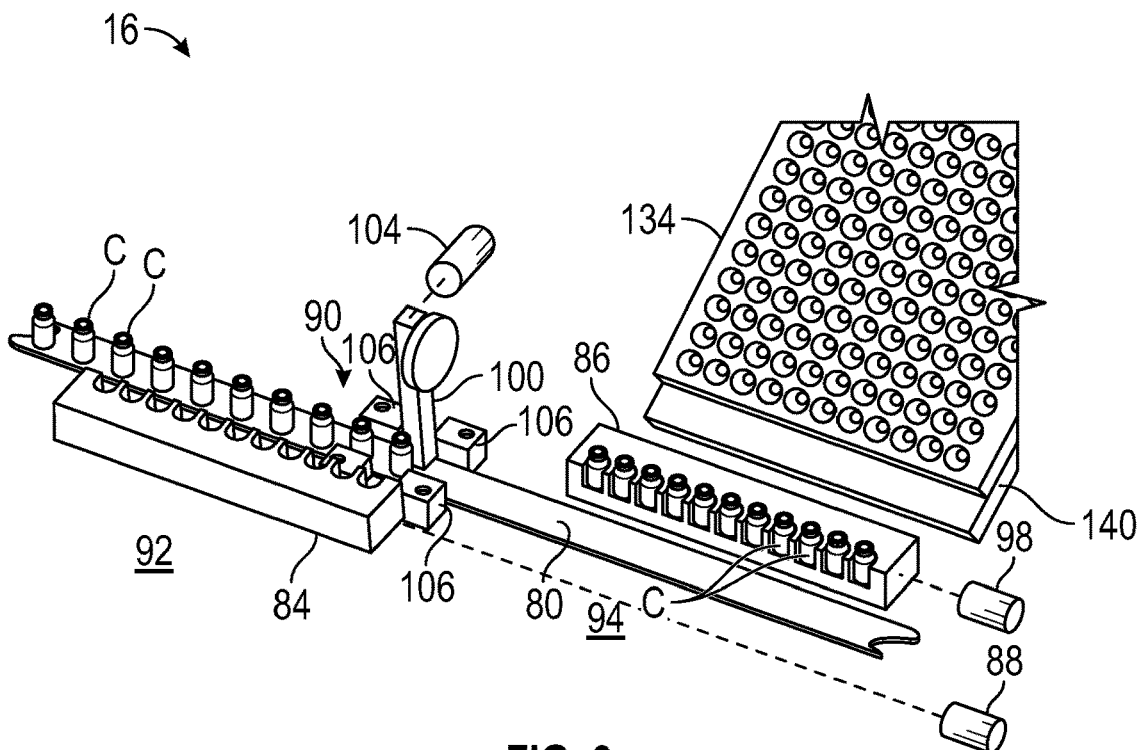
FIG. 9 is perspective view of a shuttle system at the packaging station of the glass manufacturing apparatus for loading glass containers into a cell pack.

FIG. 9 illustrates the details and handling of the glass containers C at the packaging station 16. The packaging station has a first shuttle 84 and a second shuttle 86 that are positioned at opposite sides of the discharge conveyor 80 delivering the glass containers from the inspection station 14. The first shuttle 84 is driven back and forth by a servomotor 88 between a shuttle loader 90 at a shuttle loading position 92, where the shuttle 84 is shown in FIG. 9, and a shuttle unloading position 94. The second shuttle 86 is driven back and forth by means of a servomotor 98 between the shuttle loader 90 at the shuttle loading position 92 and the shuttle unloading position 94, where the shuttle 86 is shown in FIG. 9. Both servomotors 88, 98 are controlled by the PLC to move the shuttles 84, 86 between the shuttle loading position 92 and the shuttle unloading position 94 in alternating fashion. Specifically, the first shuttle 84 is moved to the loading position 92 to receive glass containers C from the discharge conveyor 80, while the second shuttle 86 is moved to the shuttle unloading position 94 for unloading the containers from the shuttle 86. Then the shuttle positions are reversed so that the second shuttle 86 is moved to the shuttle loading position 92 to receive glass containers C from the discharge conveyor 80 while the first shuttle 84 is moved to the shuttle unloading position for unloading the containers from the shuttle 84. The loading of one shuttle while the other shuttle is unloaded reduces the packaging process time.

Figure 10:
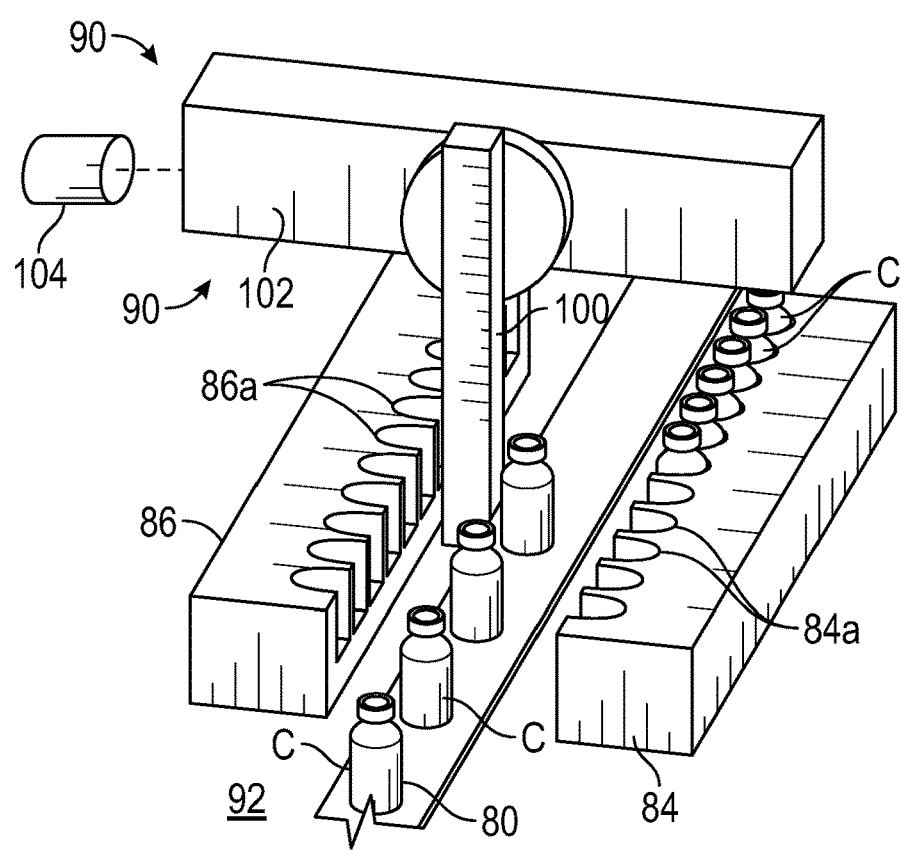
FIG. 10 is a perspective view of a shuttle loader at the loading position of the packaging station for loading glass containers into shuttles.

FIG. 10 shows the shuttle loader 90 and the shuttles 84, 86 on opposite sides of the discharge conveyor 80 at the shuttle loading position 92 for purposes of illustration. It should be understood, however, that the shuttles are loaded alternately as described above, and accordingly both shuttles are not normally positioned at the loading position 92 at the same time.

The first shuttle 84 has a number of pockets 84a with openings facing the discharge conveyor 80 in order to receive a corresponding number of glass containers C from the conveyor. For this purpose, the shuttle loader 90 is comprised of a pusher bar 100 suspended immediately above the conveyor 80 at the loading position 92 by a beam 102 that is moveable back and forth in a direction transverse to the conveyor by a servomotor 104 controlled by the PLC 20 as shown in FIG. 4. The pusher bar 100 preferably pushes the glass containers C in the series on the conveyor 80 one at a time between fence blocks 106 into a pocket 84a of the first shuttle 84 starting at one end of the shuttle. Since the loader is fixed at the loading position, after each container C is loaded into a pocket 84a, the conveyor 80 is indexed by one increment equal to the spacing of the containers on the conveyor by the PLC 20. At the same time the shuttle is indexed by the PLC by an amount equal to the spacing of the pockets so that an empty pocket is positioned adjacent the pusher bar to receive the next container in the series. By incrementing the conveyor and the shuttle separately, the spacing of the glass containers on the conveyor need not match the spacing of the pockets on the shuttle. Alternatively, if the spacing of the containers and the pockets match, the pusher bar could be longer and push multiple containers as a group into the correspondingly spaced pockets of the shuttle.

After each of the pockets 84a is loaded with a glass container, the first shuttle 84 is moved to the shuttle unloading position 94 in FIG. 9.

The second shuttle 86 has a construction similar to the construction of the first shuttle 84 except that the openings of the pockets 86a face the conveyor 80 from the opposite side of the conveyor. Glass containers C are also loaded into the pockets 86a of the second shuttle 86 in substantially the same manner as the first shuttle 84 by pushing movements of the pusher bar 100 and indexing movements of the conveyor 80 and shuttle 86. The pusher bar however pushes the containers from the opposite side of the containers into the pockets 86a. After the second shuttle 86 is loaded, the second shuttle is moved to the unloading position 94, and the first shuttle 84 is moved to the loading position as shown in FIG. 9. All the operations of the shuttles 84, 86, the conveyor 80, and the pusher bar 100 are synchronized by the PLC 20 in FIG. 4.

Figure 11:
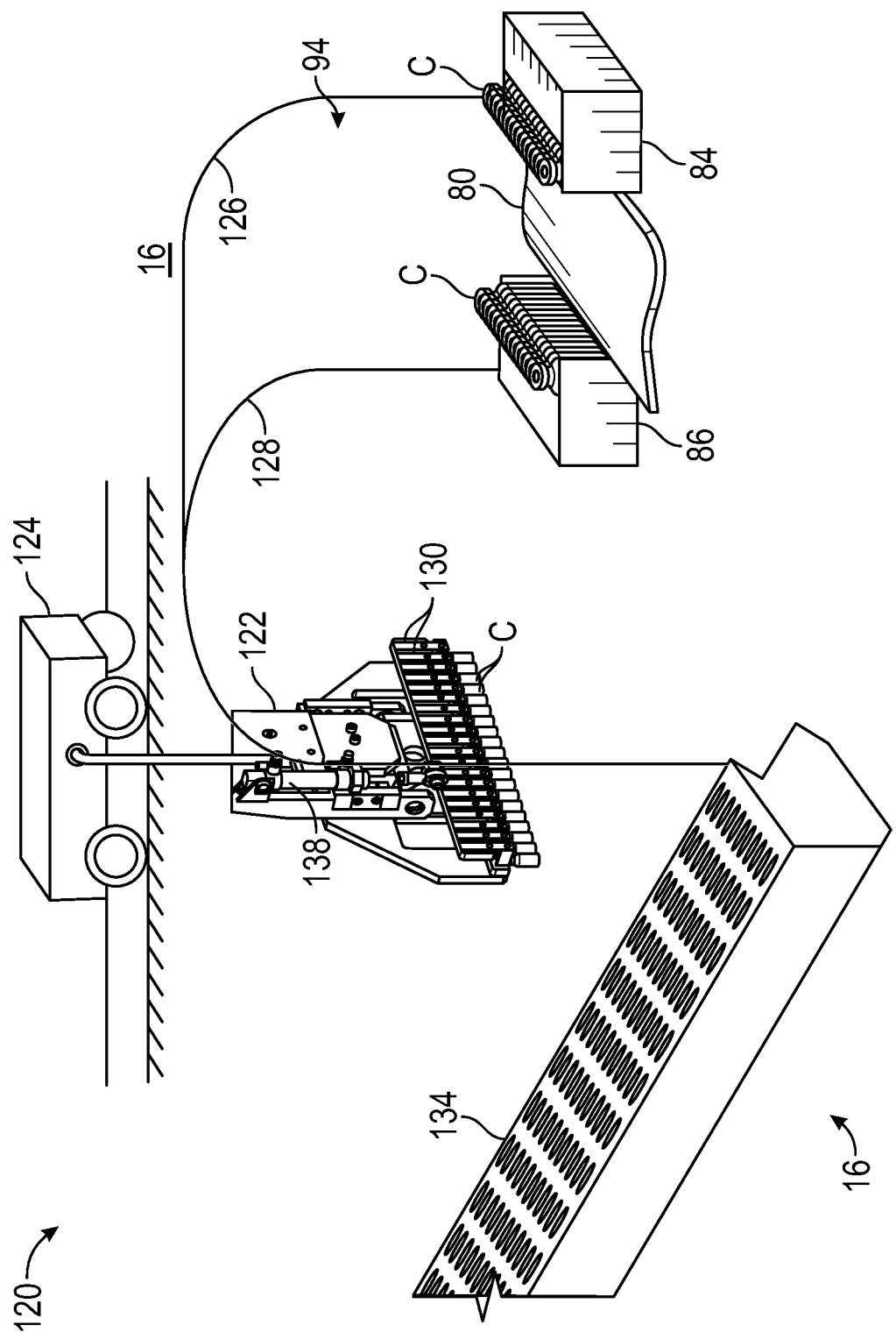
FIG. 11 is a perspective view of the shuttle unloading position of the packaging station where glass containers are transferred from the shuttles to a cell pack.

FIG. 11 illustrates the shuttle unloader 120 that unloads both the first and second shuttles 84, 86 at the shuttle unloading position 94 also shown in FIG. 9. The shuttle unloader is comprised of a transfer head 122 suspended from a moveable gantry 124 above the shuttle unloading position 94 and the packaging station 16. The shuttle unloader 120 is connected in controlling relationship with the PLC 20 as indicated in FIG. 4, and as a consequence the PLC controls the timing and operations of the transfer head 122 and the moveable gantry 124.

As shown in FIG. 11 both shuttles 84 and 86 loaded with glass containers C are shown at the unloading position for purposes of illustration. However, as explained above, the shuttles are operated in an alternating fashion between the loading position 92 (FIG. 9) and the unloading position 94. As a consequence, only one shuttle loaded with glass containers will appear at the unloading position 94 at one time, and the other shuttle will appear at another time. Nonetheless the illustration of FIG. 11 will suffice to explain the unloading of either shuttle.

Figure 12:
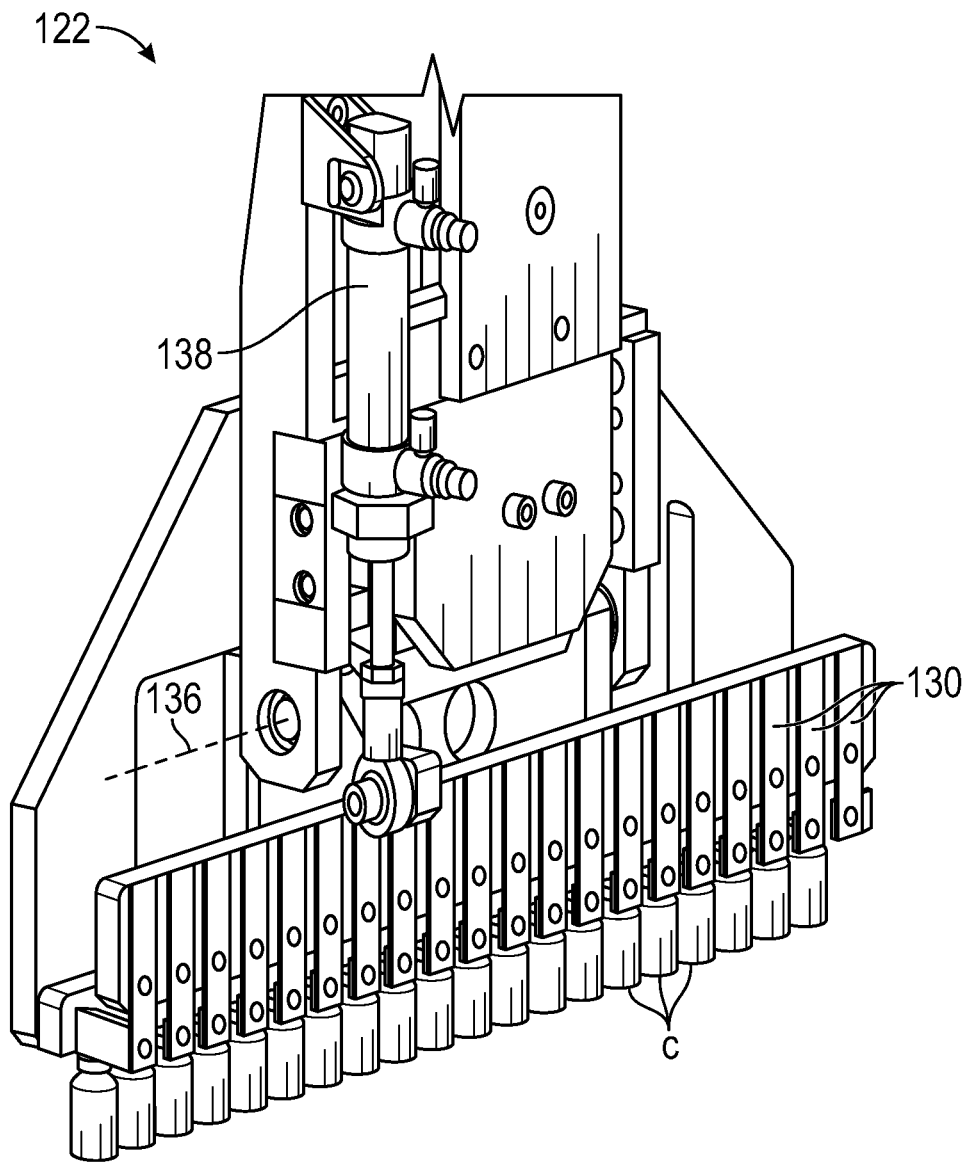
FIG. 12 is a perspective view of a transfer head for transferring glass containers from the shuttles to a cell pack.

In unloading the glass containers C from the shuttle 84, the gantry 124 initially moves the transfer head 122 along the trajectory path 126 in FIG. 11 to a pickup position overlying the shuttle 84 and the containers in the shuttle. The transfer head 122 shown in one embodiment in FIG. 12 is a vacuum head having a plurality of vacuum cups 130 arranged linearly along the bottom edge of the head. The spacing of the cups matches the spacing of the pockets 84a in the shuttle and correspondingly the uniform spacing of the containers C in the pockets. Accordingly, when the vacuum cups are positioned over the glass containers and activated, the tops of the glass containers are engaged and captured in the cups and the containers are then lifted from the pockets when the transfer head rises as shown in FIG. 12. Of course other forms of heads that capture the glass containers mechanically, preferably at the tops, can be employed.

As shown in FIG. 11 the captured containers are moved by the transfer head 122 along the trajectory 126 to a placement position over the package 134, which is illustrated as a cell pack. The cell pack is a package with individual cells having the same spacing as the glass containers C in the transfer head. A cell pack ensures that the individual glass containers do not come into contact with one another and avoids scratches or checks during shipping and handling.

The transfer head 122 in FIG. 12 is a head with a tilting feature. The vacuum cups are pivotally mounted to the head about an axis 136 and are tilted collectively by an actuator 138 about the axis to bring the glass containers into alignment with the axes of the cells in the cell pack for ease of inserting the containers into the pack. With the glass containers safely inserted into the cells, the vacuum cups 130 are deactivated to release the containers, and the transfer head is drawn away from the package 134.

With a first group of glass containers C unloaded from the shuttle 84 and stowed for example in the bottom row of cells in the package 134, the transfer head 122 is moved by the gantry 124 along the trajectory 128 to a position overlying the shuttle 86 at the unloading position 94 in preparation to unload a second group of glass containers from the shuttle. The second group of containers are stowed in the second row of cells in the package 134 in the same manner as the first group in the first row. However, if the number of cells in the cell pack can accommodate more glass containers than are held in the transfer head 122, the gantry 124 can move the transfer head laterally to fill the additional cells in the same row. The unloading of glass containers C from the shuttles 84, 86 continues under the control of the PLC until all the rows of the cell pack are filled.

FIGS. 1-3 illustrate multiple cell packages 134 mounted on a rotatable turret 140. Consequently, when one package is fully loaded with glass containers, the turret is rotated under the control of the PLC and additional packages can be loaded with glass containers from the glass manufacturing apparatus. With the described apparatus high volume of glass containers can be produced without glass-to-glass contact that can cause defects in the glass.

While in the present application preferred embodiments of the invention are described, it is to be clearly pointed out that the invention is not limited thereto and that the invention can also be carried out in other ways within the scope of the following patent claims.

What is claimed is:

1. An apparatus for placing articles in a package comprising:
   a conveyor for conveying a series of articles to a packaging station;
   first and second shuttles disposed adjacent the conveyor at the packaging station, each shuttle being movable reversibly back and forth in opposite directions between a loading position and an unloading position in the packaging station, each shuttle having a number of pockets for receiving a corresponding number of articles from the conveyor at the loading position and transferring the articles to the unloading position;
   a shuttle loader at the loading position configured to transfer the articles from the series on the conveyor to the pockets of the first and second shuttles;
   a package table adjacent the unloading position of the shuttles for supporting a package for receiving the articles;
   a shuttle unloader at the unloading position of the shuttles configured to transfer the articles from the pockets of the shuttles to the package on the table; and
   a controlled drive mechanism connected with the first and second shuttles to move the shuttles between the loading and unloading positions in alternating fashion, whereby one shuttle can be loaded with articles at the loading position while the other shuttle is unloaded at the unloading position.

2. An apparatus for placing articles as defined in claim 1 wherein:
   the shuttle loader is configured to transfer the articles one at a time from the conveyor to the pockets of the first or second shuttle.

3. An apparatus for placing articles as defined in claim 2 wherein:
   the shuttle loader is mounted in a fixed position at the loading position; and
   the conveyor and the shuttles are controlled by the controlled drive mechanism to position an article and a pocket of a shuttle at the loading position at the same time for transfer of the article from the conveyor to the pocket of the shuttle.

4. An apparatus for placing individual articles as defined in claim 3 wherein:

the shuttle loader has a pusher bar that transfers an article from the conveyor to a pocket of the first or second shuttle.

5. An apparatus for placing individual articles as defined in claim 1 wherein:
the first shuttle and the second shuttle are mounted on opposite sides of the conveyor.

6. An apparatus for placing individual articles as defined in claim 1 wherein:
the controlled drive mechanism for the first and second shuttles includes a first drive motor for the first shuttle, and a second drive motor for the second shuttle, whereby the first and second shuttles can be driven separately.

7. An apparatus for placing individual articles as defined in claim 6 wherein:
the controlled drive mechanism is connected with a programmable logic controller connected in operable relationship with each of the conveyor, the first and second shuttles, the shuttle loader and the shuttle unloader to synchronize their operations.

8. An apparatus for placing individual articles as defined in claim 1 wherein:
the shuttle unloader includes a transfer head configured to engage each article in the pockets of the first or second shuttle at the top of the article for lifting, transfer, and lowering of each article respectively into a package on the package table.

9. An apparatus for placing individual articles as defined in claim 8 where the transfer head is a vacuum head for engaging and releasing the articles at the top.

10. An apparatus for placing individual articles as defined in claim 8 wherein the transfer head is a tilting head for aligning the articles with the cells of a cell pack on the package table.

11. An apparatus for placing individual articles as defined in claim 1 wherein:
the package table has a rotatable turret for supporting multiple packages to receive the articles.

\* \* \* \* \*